United States Patent
Schenck et al.

[19]

[11] Patent Number: 6,076,854
[45] Date of Patent: Jun. 20, 2000

[54] AIR BAG ASSEMBLY WITH SELECTIVELY VARIABLE VOLUME

[75] Inventors: David Patrick Schenck, Miamisburg; Graham Thornton Spencer, Troy, both of Ohio

[73] Assignee: General Motors Corporation, Detroit, Mich.

[21] Appl. No.: 09/212,447

[22] Filed: Dec. 16, 1998

[51] Int. Cl.[7] .................................................. B60R 21/16
[52] U.S. Cl. ...................................... 280/743.2; 280/728.1
[58] Field of Search ............................. 280/743.2, 743.1, 280/742, 728.1

[56] References Cited

U.S. PATENT DOCUMENTS

| | | |
|---|---|---|
| 3,473,824 | 10/1969 | Carey et al. . |
| 3,476,402 | 11/1969 | Wilfert . |
| 3,586,347 | 6/1971 | Carey et al. . |
| 3,752,501 | 8/1973 | Daniel et al. . |
| 3,761,111 | 9/1973 | Kemper . |
| 3,802,719 | 4/1974 | Brown . |
| 3,836,169 | 9/1974 | Schiesterl . |
| 3,961,806 | 6/1976 | Katter . |
| 4,006,918 | 2/1977 | MacFarland . |
| 4,262,931 | 4/1981 | Strasser et al. . |
| 4,265,468 | 5/1981 | Suszko et al. . |
| 5,009,452 | 4/1991 | Miller . |
| 5,094,477 | 3/1992 | Togawa . |
| 5,125,682 | 6/1992 | Hensler et al. . |
| 5,129,675 | 7/1992 | Wang . |
| 5,174,599 | 12/1992 | Hull et al. . |
| 5,246,250 | 9/1993 | Wolanin et al. . |
| 5,249,824 | 10/1993 | Swann et al. . |
| 5,269,561 | 12/1993 | Davis et al. . |
| 5,308,113 | 5/1994 | Moriset . |
| 5,516,146 | 5/1996 | Kopitzke ............................... 280/728.2 |
| 5,762,367 | 6/1998 | Wolanin . |
| 5,813,696 | 9/1998 | Hill ...................................... 280/743.2 |
| 5,997,037 | 12/1999 | Hill et al. ............................. 280/743.2 |

FOREIGN PATENT DOCUMENTS

| | | |
|---|---|---|
| 2248393 | 4/1980 | Germany . |
| 3618060 | 12/1987 | Germany . |
| 4305050 | 9/1993 | Germany . |
| 5-85295 | 4/1993 | Japan . |
| 2265118 | 9/1993 | United Kingdom . |

*Primary Examiner*—Brian L. Johnson
*Assistant Examiner*—Faye M. Fleming
*Attorney, Agent, or Firm*—Kathryn A. Marra

[57] ABSTRACT

In one embodiment, an air bag assembly comprises an air bag and a primary inflator for inflating the air bag. The air bag has a full inflated volume and a lesser partial inflated volume which is achieved by anchoring a plurality of tethers with a heat-sensitive link to reduce the inflated volume of the air bag to the partial inflated volume. A secondary inflator is selectively operable to release the tethers and coact with the primary inflator to inflate the air bag to the full inflated volume. Actuation of only the primary inflator inflates the air bag to only partial volume as constrained by the tethers. Actuation of the secondary inflator melts the link to release the tethers and inflate the air bag to full volume. In another embodiment, the secondary inflator is replaced by a tether control which includes an actuator that is selectively operable to release the tethers. The air bag includes a vent which is normally open so that operation of only the inflator will inflate the air bag to only partial volume as constrained by the tethers, while operation of the actuator releases the tethers and closes the vent and enable the inflator to inflate the air bag to full inflated volume.

7 Claims, 3 Drawing Sheets

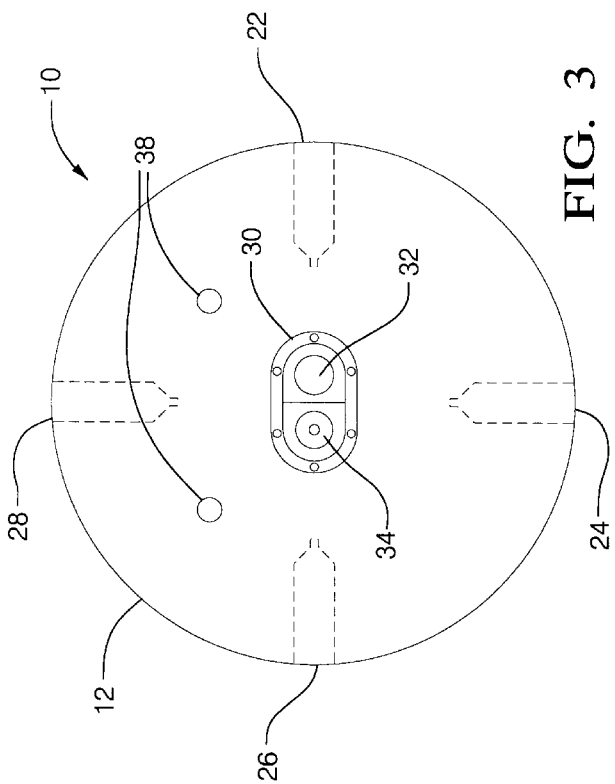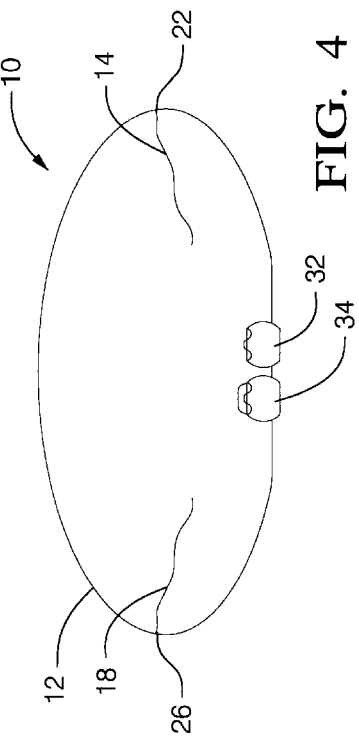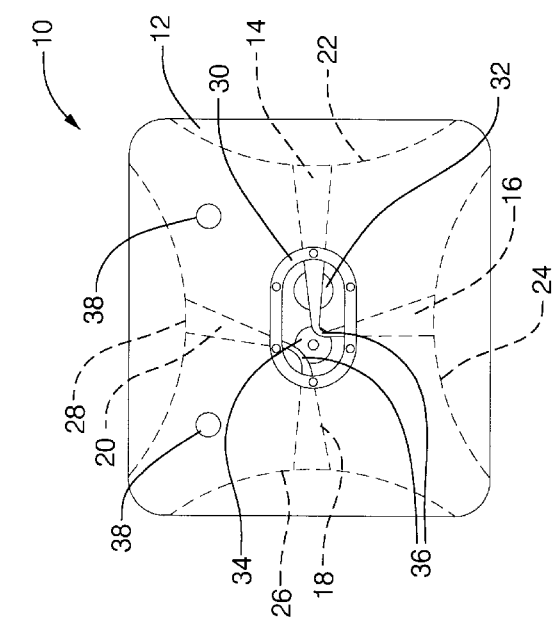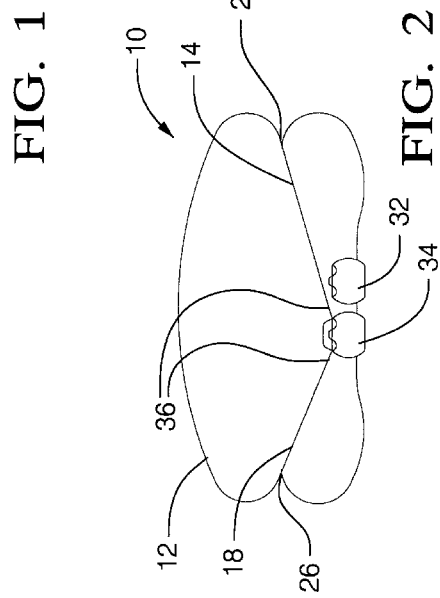

AIR BAG ASSEMBLY WITH SELECTIVELY VARIABLE VOLUME

TECHNICAL FIELD

This invention relates generally to inflatable air bag assemblies and, more particularly, to an air bag assembly having a selectively variable volume.

BACKGROUND OF THE INVENTION

Conventional air bags include an inflator and an air bag, or cushion, having a predetermined inflated volume. When actuated, the inflator inflates the airbag at a rate determined by the rate of gas generation by the inflator. This system treats all passengers and all crashes the same. However, it is known that vehicle occupants vary in size, weight, and seat position and seat belt usage. Also, crashes vary in severity of deceleration forces experienced by vehicle occupants. Thus, all of these variables produce varying conditions, which are experienced by air bag systems.

Air bag systems are currently being developed to include enhanced sensing of vehicle occupant size, weight, seat position and seat belt usage, and crash severity. Much development is occurring to tailor the performance of these systems to vehicle occupants' specific needs. Much of this development centers on varying the inflation rate of the airbags.

In situations where low inflation rate air bag deployment is desired, air bag volume may be too great for the system to maintain optimal occupant protection. If a cushion is underinflated, the occupant must penetrate the air bag some distance before internal air bag pressure becomes sufficient to restrain the occupant.

Currently, there are two types of driver air bags: face bags and full size bags. The former (roughly of 40 liter size) are used in areas where seatbelt usage is high, such as in Europe, while the latter (roughly 60 liter size) are primarily used in the United States where seat belt usage is lower and where government regulations require validation in unbelted occupant testing. Such a variable volume air bag, used in conjunction with a seatbelt buckle sensor, could offer an appropriate amount of restraint. In this manner, an unbelted occupant would experience a full torso and head restraint, while a belted occupant would experience head and face restraint.

SUMMARY OF THE INVENTION

It is an object of this invention to provide an air bag assembly that includes a variable volume air bag and a variable gas inflator output.

In one aspect, this invention features an air bag assembly comprising an air bag and a primary inflator for inflating the air bag. The air bag has a full inflated volume and a lesser partial inflated volume which is achieved by anchoring a plurality of tethers to reduce the inflated volume of the air bag to the partial inflated volume. A secondary inflator is selectively operable to release the tethers and coact with the primary inflator to inflate the air bag to the full inflated volume. Actuation of only the primary inflator inflates the air bag to only partial volume as constrained by the tethers. Selective further actuation of the secondary inflator releases the tethers and inflates the air bag to full volume.

Preferably, the tethers are secured by a heat-sensitive link, which is severed by gases from the secondary inflator.

In another aspect, this invention features a tether control for anchoring the tethers which includes an actuator that is selectively operable to release the tethers and enable inflation of the air bag to full volume, whereby operation of only the inflator will inflate the air bag to only partial volume as constrained by the tethers, and further operation of the actuator will release the tethers and enable inflation of the air bag to full volume. Preferably, a normally open air bag vent partially vents the air bag during inflation to partial inflated volume, but operation of the actuator releases the tethers and closes the vent enabling inflation of the air bag to full inflated volume.

BRIEF DESCRIPTION OF THE DRAWINGS

FIG. 1 is plan view of a tethered air bag according to this invention;

FIG. 2 is a cutaway view of the air bag of FIG. 1, shown inflated to partial volume;

FIG. 3 is a plan view of the air bag, shown inflated to full volume;

FIG. 4 is a cutaway view of the air bag shown in FIG. 3;

DESCRIPTION OF THE PREFERRED EMBODIMENT

Figure 5:
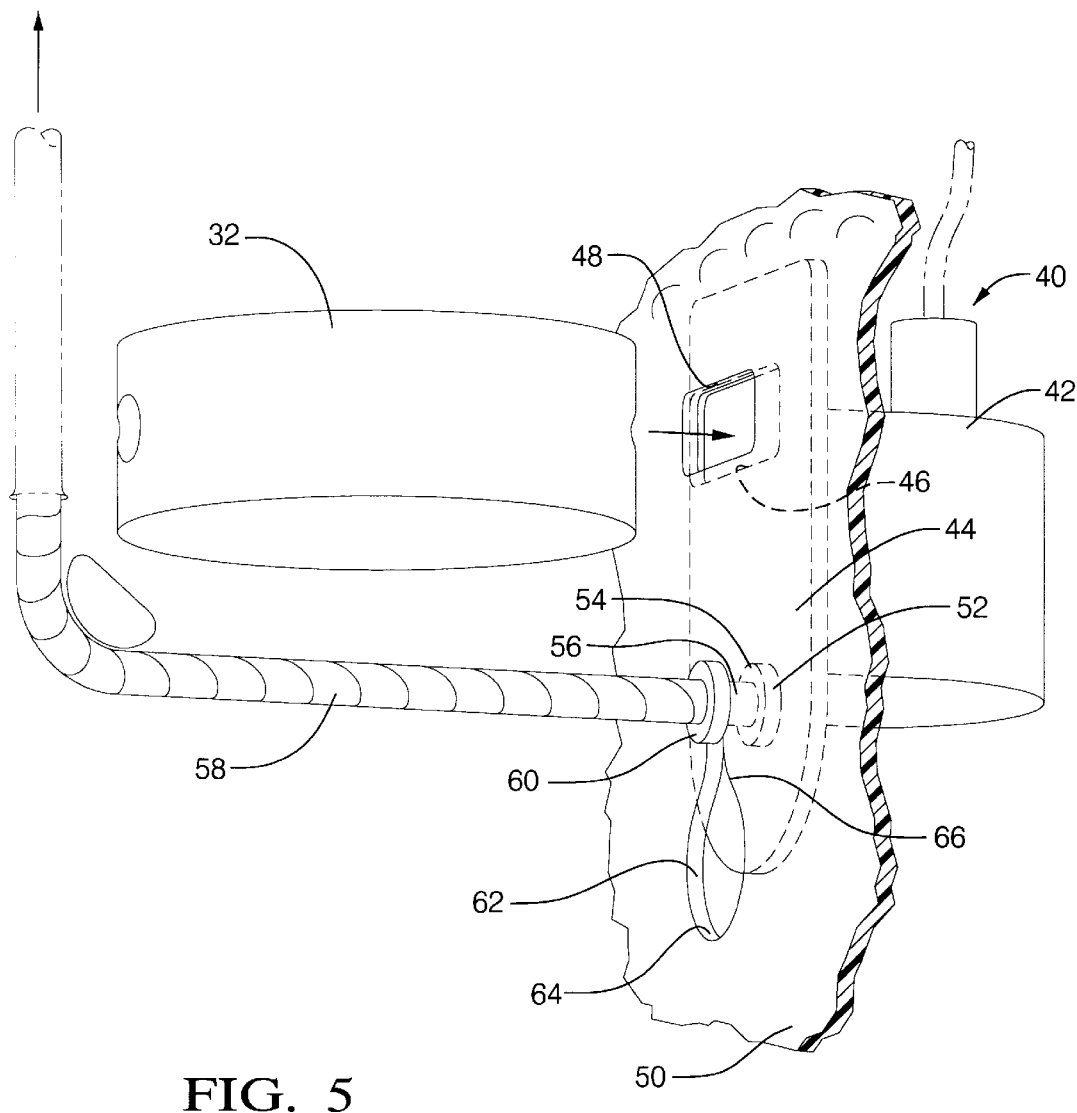
FIG. 5 is an enlarged perspective view of an alternative embodiment of this invention, showing an actuator for controlling the tethers and air bag vent, with the vent shown open and the actuator in the unactuated, the partial volume position.

As shown in FIGS. 1 and 2, an air bag assembly 10 includes an air bag 12 that has four tethers 14, 16, 18, 20 that are attached at their outer ends to the periphery of air bag 12 at spaced points 22, 24, 26, 28, respectively. A mounting bracket 30 mounts a primary inflator 32 and a secondary inflator 34.

Tethers 22 and 24 are secured to the surface of secondary inflator 34 by a heat-sensitive link 36, while tethers 26 and 28 are also mounted by a similar link 36. Air bag 12 also includes a pair of ride-down vents 38. FIG. 2 illustrates air bag 12 in its partially-inflated condition as the result of actuation of primary inflator 32 only. Tethers 22, 24, 26, 28 constrain inflation of air bag 12 to its fully inflated condition. In its partially-inflated condition, air bag 12 has a volume of approximately 40 liters and is suitable for use as a face bag, as previously described.

Should a fully inflated air bag 12 be desired, as selectively controlled by a control (not shown), primary inflator 32 will be activated, as will secondary inflator 34. As secondary inflator 34 is activated, its discharged hot gases will melt the heat-sensitive links 36 to release tethers 22, 24, 26, 28, as illustrated in FIGS. 3 and 4, so that air bag 12 is unconstrained. Inflators 32 and 34 will now coact to inflate air bag 12 to its fully inflated condition. In this fully-inflated condition, air bag 12 has a volume of approximately 60 liters and is suitable for use as a full bag, as previously described.

Figure 6:
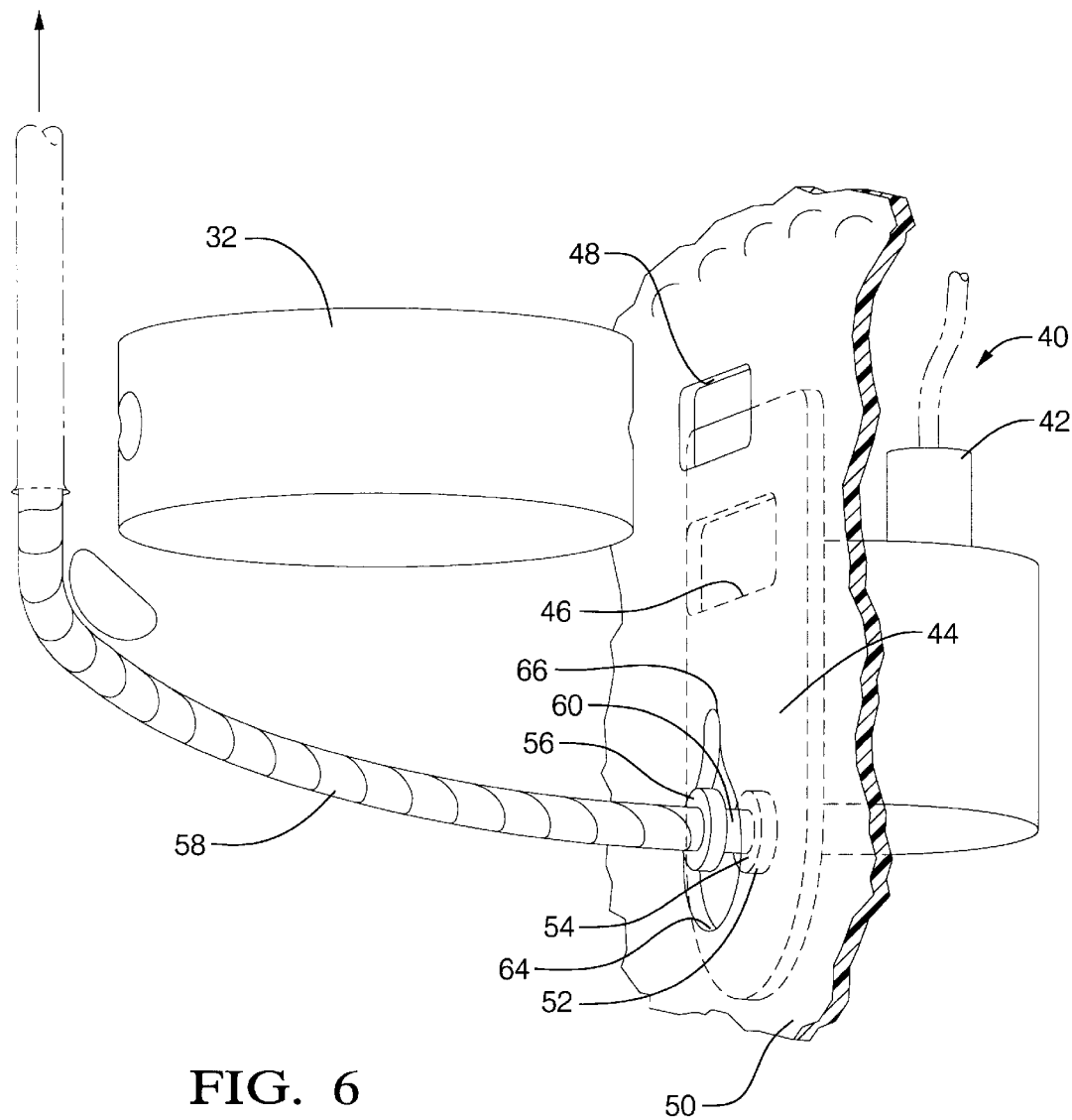
FIG. 6 is a view similar to FIG. 5, with the actuator shown in the actuated, full volume position, with the vent closed.

An alternative embodiment is illustrated in FIGS. 5 and 6, in which the secondary actuator is replaced by a tether control 40 that includes a pyrotechnic squib-operated actuator 42 that slides a plate 44 vertically downward from the FIG. 5 position to the FIG. 6 position when actuated. Plate 44 includes a vent hole 46 that registers with an air bag vent hole 48 in an air bag plate 50 adjacent primary inflator 32 in the FIG. 5 unactuated position. Plate 44 has a recess 52 which receives a complementary head 54 of a stud 56 that is mounted on the end of a tether tie-down 58 that mounts the ends of the tethers (not shown). Stud 54 mounts a spaced collar 60, while plate 50 includes a tapered slot 62 which is larger than stud head 54 at its bottom 64, but smaller at its top 66. In the FIG. 5 position, stud head 54 is captured within recess 52 where it is trapped by the area of plate 44 surrounding slot top 66.

When inflator 32 is actuated with actuator 42 unactuated, as in FIG. 5, tether anchor 58 maintains the tethers unreleased, so that air bag 12 is maintained in its FIGS. 1 and 2 partial inflated volume position. Part of the discharge gases from inflator 32 escape through slot 46 and vent 48, thus limiting the pressure in the partially-inflated air bag.

Should a full air bag be desired, actuation of inflator 32 is accompanied by actuation of actuator 42, which slides plate 44 downward to its FIG. 6 position. This frees stud head 56 for removal from recess 52, allowing the expansion of the air bag to move tether anchor 58 to release the tethers for expansion of the air bag to full inflated position of FIGS. 3 and 4. As plate 44 slides downward, its slot 46 moves downward, causing plate 44 to cover air bag vent 48. This retains all of the discharge gasses from inflator 32 for inflating the now-larger air bag.

Thus, this invention provides two versions of an air bag assembly which includes a variable volume air bag having a variable inflator output. While only a preferred and alternative embodiment have been illustrated and described, obvious modifications thereof are contemplated within the scope of this invention and the following claims.

What is claimed is:

1. An air bag assembly comprising an air bag and a primary inflator for inflating the air bag upon actuation thereof, characterized by the air bag having a full inflated volume and a lesser partial inflated volume, and including a plurality of tethers, and means for anchoring the tethers to reduce the inflated volume of the air bag to the partial inflated volume which includes a secondary inflator that is selectively operable to release the tethers and coact with the primary inflator to inflate the air bag to full volume, whereby actuation of only the primary inflator will inflate the air bag to only partial volume as constrained by the tethers, and further actuation of the secondary inflator will release the tethers and inflate the air bag to full volume.

2. The air bag assembly of claim 1, wherein the inflators produce hot gases to inflate the air bag, and further characterized by the tether anchoring means including a heat-sensitive link that is melted by the heat of the gases produced by the secondary inflator to release the tethers.

3. An air bag assembly comprising an air bag and an inflator for inflating the air bag upon actuation thereof, characterized by the air bag having a full inflated volume and a lesser partial inflated volume, and including a plurality of tethers, and a tether control for anchoring the tethers to reduce the inflated volume of the air bag from full inflated volume to partial inflated volume, including an actuator that is selectively operable to release the tethers and enable inflation of the air bag to full volume, whereby operation of only the inflator will inflate the air bag to only partial volume as constrained by the tethers, and further operation of the actuator will release the tethers and enable inflation of the air bag to full volume.

4. The air bag assembly of claim 3, further characterized by the tether control including a normally open air bag vent for partially venting the air bag during inflation to partial inflated volume, and operation of the actuator releasing the tethers and closing the vent during inflation of the air bag to full inflated volume.

5. The air bag assembly of claim 4, further characterized by the tether control including a secondary inflator, and selective operation of the secondary inflator releasing the tethers and coacting with the primary inflator to inflate the air bag to full inflated volume.

6. The air bag assembly of claim 5, wherein the inflators produce hot gases to inflate the air bag, and further characterized by the tether control including a heat-sensitive link that is melted by the heat of the hot gases produced by the secondary inflator to release the tethers.

7. The air bag assembly of claim 6, further characterized by the air bag having four circumferentially-spaced internal tethers, each attached to the secondary inflator by a heat-sensitive material link located in the path of hot gases produced by the secondary inflator.

* * * * *